United States Patent
Li et al.

(10) Patent No.: US 10,361,613 B2
(45) Date of Patent: Jul. 23, 2019

(54) SINGLE PHASE MOTOR AND ROTOR, HAVING PLURALITY OF PERMANENT MAGNETS, OF THE SAME

(71) Applicant: JOHNSON ELECTRIC INTERNATIONAL AG, Murten (CH)

(72) Inventors: Yue Li, Hong Kong (CN); Tao Zhang, Shenzhen (CN); Jie Chai, Shenzhen (CN); Chui You Zhou, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 210 days.

(21) Appl. No.: 15/421,535

(22) Filed: Feb. 1, 2017

(65) Prior Publication Data
US 2017/0222524 A1    Aug. 3, 2017

(30) Foreign Application Priority Data

Feb. 1, 2016   (CN) .......................... 2016 1 0072465

(51) Int. Cl.
| | |
|---|---|
| *H02K 1/27* | (2006.01) |
| *H02K 19/04* | (2006.01) |
| *H02K 1/14* | (2006.01) |
| *H02K 3/18* | (2006.01) |
| *H02K 29/03* | (2006.01) |

(52) U.S. Cl.
CPC ............. *H02K 19/04* (2013.01); *H02K 1/146* (2013.01); *H02K 1/276* (2013.01); *H02K 1/2706* (2013.01); *H02K 3/18* (2013.01); *H02K 29/03* (2013.01)

(58) Field of Classification Search
CPC .... H02K 1/276; H02K 1/2706; H02K 1/2753; H02K 29/03; H02K 19/04; H02K 3/18; H02K 1/146
USPC ............ 310/156.46, 156.11, 156.45, 156.48, 310/156.53
See application file for complete search history.

(56) References Cited

U.S. PATENT DOCUMENTS

| | | | | |
|---|---|---|---|---|
| 2003/0218399 A1* | 11/2003 | Iles-Klumpner | ....... | H02K 1/276 310/156.53 |
| 2005/0200223 A1* | 9/2005 | Tajima | ................. | H02K 1/2766 310/156.46 |
| 2005/0225194 A1* | 10/2005 | Murakami | ............. | H02K 1/278 310/216.113 |
| 2007/0200447 A1* | 8/2007 | Adaniya | ................ | H02K 1/276 310/156.53 |
| 2011/0062814 A1* | 3/2011 | Adaniya | ................ | H02K 1/276 310/156.53 |
| 2014/0232230 A1* | 8/2014 | Yabe | ...................... | H02K 1/276 310/156.11 |

* cited by examiner

*Primary Examiner* — Michael Andrews
(74) *Attorney, Agent, or Firm* — Muncy, Geissler, Olds & Lowe, P.C.

(57) ABSTRACT

A single phase motor includes a stator and a rotor. The stator includes a stator core. The stator core includes an outer yoke and a plurality of stator teeth. Each stator tooth includes a winding portion and a pole shoe coupled to the winding portion. The rotor includes a rotor core and a plurality of permanent magnets. The permanent magnets are evenly spaced and embedded in the rotor core. An outer circumferential wall of the rotor core is an irregular cylinder and includes a plurality of spaced circular arc surfaces and transition surfaces. The starting of the single phase motor is stable and reliable. The present invention also provides a rotor for the single phase motor.

16 Claims, 7 Drawing Sheets

SINGLE PHASE MOTOR AND ROTOR, HAVING PLURALITY OF PERMANENT MAGNETS, OF THE SAME

CROSS REFERENCE TO RELATED APPLICATIONS

This non-provisional patent application claims priority under 35 U.S.C. § 119(a) from Patent Application No. 201610072465.7 filed in The People's Republic of China on Feb. 1, 2016.

FIELD OF THE INVENTION

The present disclosure relates to the field of motors, more particularly, to a single phase motor and its rotor.

BACKGROUND OF THE INVENTION

Single phase brushless DC motor has been developed rapidly in recent years, and the structure is generally winding the stator windings on the stator core, which creates a changing magnetic field after powered on, so as to drive the rotors embedded with permanent magnet rotation. As the stator core needs to be wound with stator windings, therefore, slots are usually provided on the stator core for proceeding the process of automatic winding.

However, the existence of the slots increase the magnetic resistance between the part of the stator core where the slot is defined and the rotor permanent magnet, the stator core has starting dead point. That is to say that the magnetic pole axis of the rotor automatically deflects towards a direction in which the magnetic resistance is small when the motor is in a non-energized state or has no significant rotation block, that is, the magnetic pole axis of the rotor deviates from the axial direction of the slots. At this point, the rotor is subjected to zero torque, resulting in motor starting instability.

SUMMARY OF THE INVENTION

In view of this, the present disclosure is designed to provide a new-typed single phase motor rotor which can improve the starting reliability and a single phase motor using such rotor.

A single phase motor rotor comprises a rotor core and a plurality of permanent magnets. The permanent magnets are evenly spaced and embedded in the rotor core. An outer circumferential wall of the rotor core is an irregular cylinder and comprises a plurality of spaced circular arc surfaces and transition surfaces.

As a preferred embodiment, a center line of a neutral region of adjacent two of the permanent magnets coincides with a center line of a corresponding one of the transition surfaces.

As a preferred embodiment, a magnetic pole axis of each permanent magnet coincides with a center line of a circular arc surface near the permanent magnet.

As a preferred embodiment, the plurality circular arc surfaces are provided on a surface of a same cylinder.

As a preferred embodiment, the transition surfaces are short flat surfaces inwardly concaved relative to the circular arc surfaces, or the transition surfaces are formed by connecting a plurality of short flat surfaces inwardly concaved relative to the circular arc surfaces.

As a preferred embodiment, each transition surface is a substantial circular arc surface, the curvature of the transition surface is smaller than the curvature of the circular arc surface, and bending directions of the transition surfaces and the circular arc surfaces are the same.

A single phase motor includes a stator and a rotor as described above. The stator includes a stator core. The stator core includes an outer yoke and a plurality of stator teeth. Each stator tooth includes a winding portion and a pole shoe coupled to the winding portion.

As a preferred embodiment, a slot is defined between two adjacent pole shoes and an uneven air gap with unequal spacing is defined between the pole shoes and the rotor.

As a preferred embodiment, a distance between the transition surfaces and the pole shoes exceeds a distance between the circular arc surfaces and the pole shoes.

As a preferred embodiment, a center line of a neutral region of adjacent two permanent magnets substantially coincides with a center line of a corresponding one of the transition surfaces and a center line of a corresponding one of the winding portions upon a condition that the motor is in a non-energized state.

As a preferred embodiment, a minimum circumferential distance of the slot is a, a maximum distance from the transition surface along the radial direction of the rotor core to the corresponding pole shoe is b1, a minimum distance from the circular arc surface along the radial direction of the rotor core to the pole shoe is b2, wherein, $b2<a<b1$.

As a preferred embodiment, the maximum distance from the transition surface along the radial direction of the rotor core to the pole shoe is more than the minimum distance from the circular arc surface of the rotor core to the pole shoe, but it is less than three times the minimum distance from the circular arc surface of the rotor core to the pole shoe.

As a preferred embodiment, a pole-arc angle of the rotor is c, wherein, $100°<c<150°$ electrical angle.

As a preferred embodiment, a starting angle of the motor is between 70° and 110° electrical angle.

As a preferred embodiment, each of the pole shoes comprise a pole arc surface towards the rotor, the pole arc surfaces of the pole shoes are located on a same cylindrical surface and enclose an accommodating space together, the rotor is rotatably received in the accommodating space.

The motor of the present disclosure has been provided with a plurality of circular arc surfaces and transition surfaces on the circumferential wall of the rotor core, so that the starting position of the rotor avoids the starting dead point of the motor, and the starting of the motor becomes more stable and reliable, and requires low starting current.

DETAILED DESCRIPTION OF THE EMBODIMENTS

More clear and complete descriptions concerning the technical solution of the embodiments of the present invention will now be made with reference to the accompanying drawings of the embodiments of the present disclosure, obviously, the embodiments described hereof are just a partial embodiments of the present invention, rather than all embodiments of the present invention. All other embodiments obtained by those ordinary technicians in the art based on the embodiments of the present invention under the premise of making no contribution of creative work shall belong to the scope of the protection of the present invention.

It's important to note that when a component is referred to as being "fixed" to another component, it may be fixed directly on another component or there may be an intermediate component as well. When a component is identified as being "connected" to another component, it may be directly connected to another component or there may be an intermediate component at the same time. When a component is considered to be "provided on" another component, it may be provided directly on another component or there may be an intermediate component at the same time.

Unless otherwise defined, all technical and scientific terminologies used herein have the same meaning as commonly understood by technicians of the technical field to which the present invention belongs. The terminologies used herein in the descriptions of the present invention are for the purpose of describing particular embodiment only, they are not intended to limit the present invention.

The technical solution and other advantageous effects of the present invention will become apparent from the following detailed description of the preferred embodiments of the present disclosure with reference to the accompanying drawings. The accompanying drawings are provided for the purpose of illustration and description only other than limit the present invention. The dimensions as shown in the accompanying drawings are for convenience of illustration only, they won't limit the proportional relation.

Figure 1:
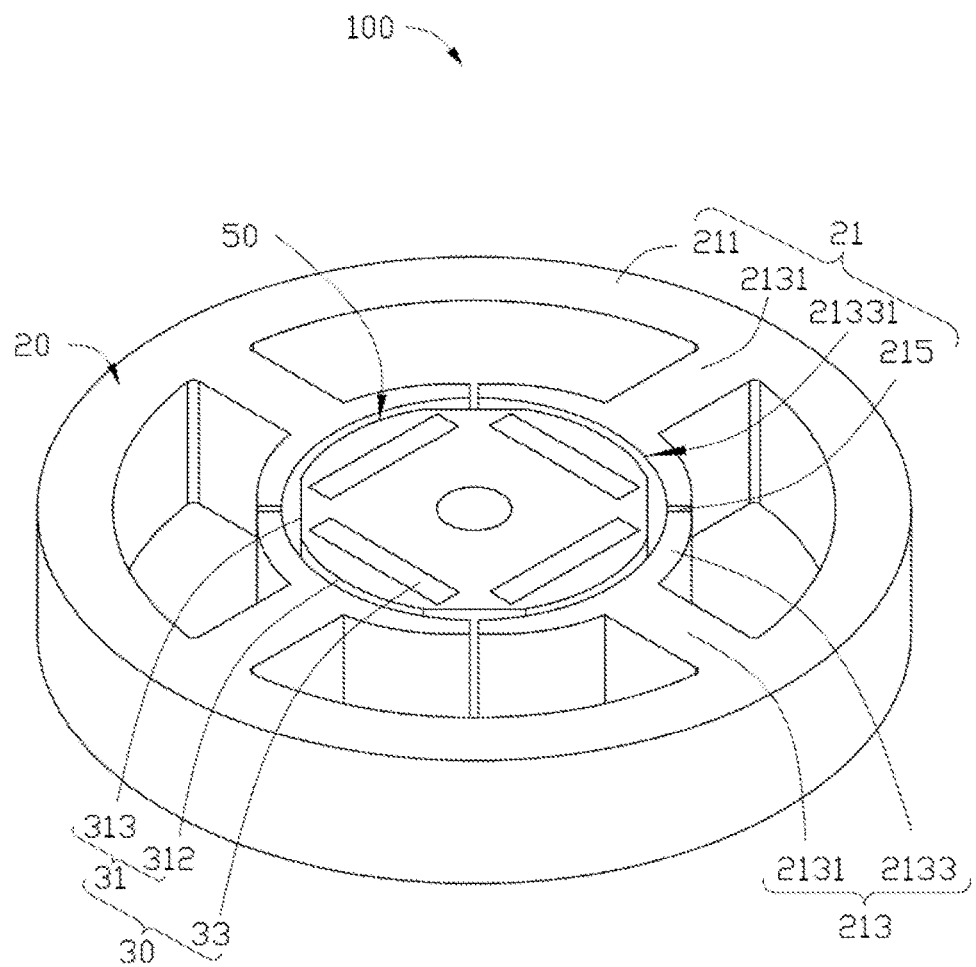
FIG. 1 is a perspective, schematic view of a stator and a rotor according to a first embodiment of the present disclosure.

Referring to FIG. 1, a motor 100 according to an embodiment of the present disclosure comprises a stator 20 and a rotor 30 rotatable relatively to the stator 20. The stator 20 comprises a stator core 21, two end caps at both ends of the stator core 21, and a half-open cylindrical casing (not shown). The stator core 21 is mounted on an inner wall of the casing. The two end caps are mounted on both ends of the casing. The rotor 30 is rotatably housed within the stator 20, and both ends of a rotating shaft (not shown) of the rotor 30 are mounted to the end caps through bearings (not shown). Preferably, the motor 100 is a single phase brushless DC motor.

The stator 20 further comprises an insulated wire holder and stator windings (not shown). The insulated wire holder is mounted on the stator core 21 and the stator windings are arranged on corresponding insulated wire holder. The stator core 21 and the stator windings are isolated by the insulated wire holder so as to insulate the stator core 21 and the corresponding stator windings.

Figure 2:
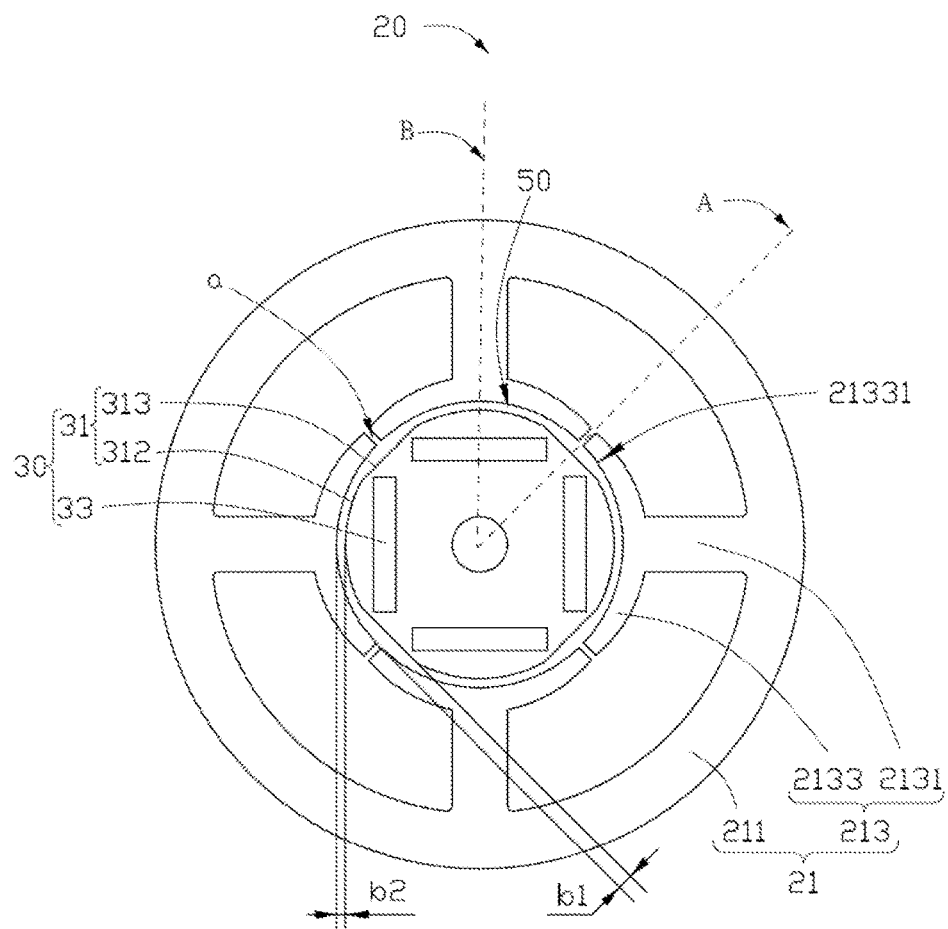
FIG. 2 is a top view of the stator and the rotor as shown in FIG. 1.

Referring to FIG. 2, the stator core 21 comprises an outer yoke 211 and stator teeth 213. In the present embodiment, the stator core is a four-pole four-slot structure, in which four stator teeth 213 are provided inside the outer yoke 211, and four winding slots are defined between the four stator teeth 213. The outer yoke 211 is a closed loop, and it is therefore referred to as an outer ring portion of the stator 20.

Figure 3:
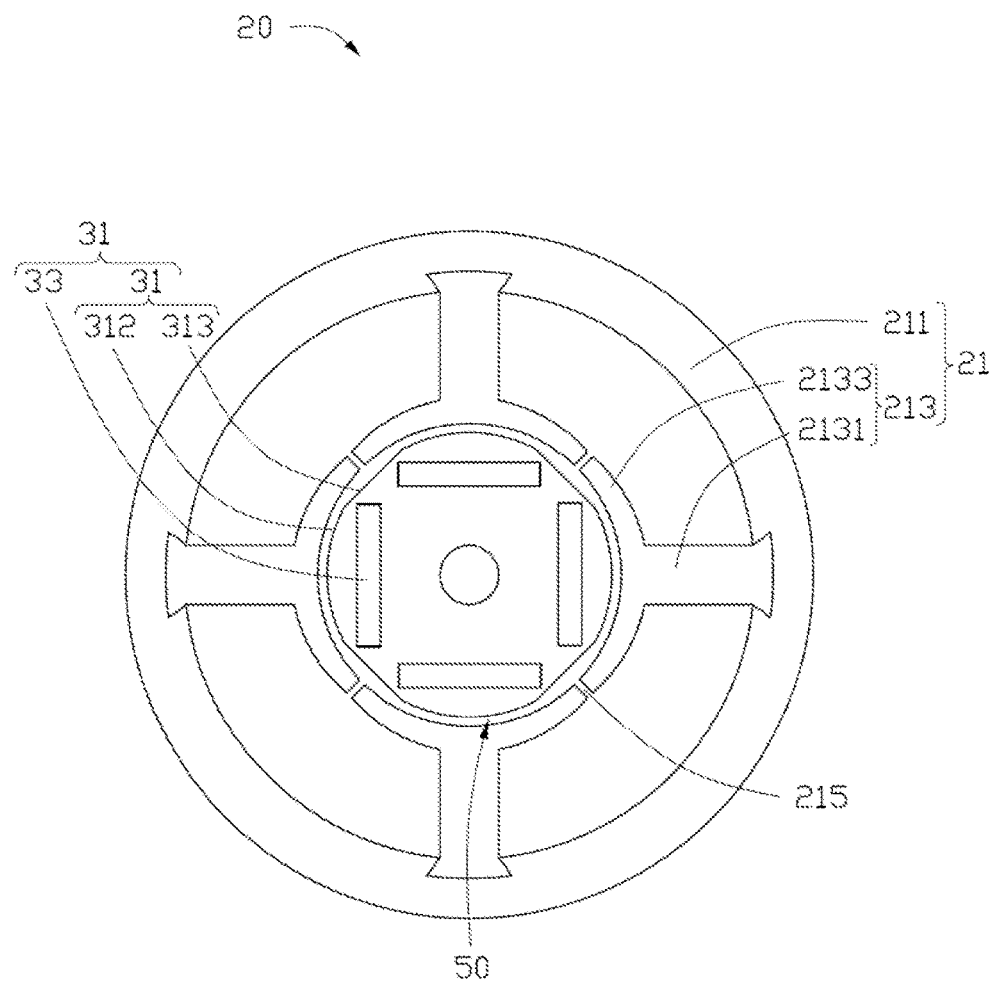
FIG. 3 is a top view of a stator and a rotor according to another embodiment of the present disclosure.

Each of the stator teeth 213 comprises an integrally formed winding portion 2131 and a pole shoe 2133. In the present embodiment, each stator tooth 213 may be formed by extending radially inward from the outer yoke 211. The winding portion 2131 is substantially square. In other embodiments, as shown in FIG. 3, the stator core 21 of the motor 100 may adopt a split type structure, that is, the stator teeth 213 and the outer yoke 211 are detachably connected, the adoption of detachable connection facilitates the winding of the stator winding. The end of the winding portion 2131 away from the corresponding pole shoe 2133 is connected to the inner side of the outer yoke 211 by way of, for example, a dovetail groove embedment.

The pole shoe 2133 is provided on one end of the winding portion 2131, each of the pole shoes 2133 is an arc-shaped structure extending from one end of the winding portion 2133 along the rotor circumferential direction, and the end of each winding portion 2133 away from the outer yoke 211 is connected to the center of the outer circular arc of corresponding pole shoe 2133. In the present embodiment, the four stator teeth 213 are uniformly spaced and mounted inside the outer yoke 211, and the four pole shoes 2133 substantially enclose a circle concentric with the outer yoke 211. Wherein, a slot 215 is defined between adjacent two pole shoes 2133 to prevent leakage of magnetic flux therefrom; in addition, when the structure, as shown in FIG. 2. of an integrated stator core is adopted, the slots 215 is configured to allow the wires for forming the stator windings to pass, so as to wind the stator winding, and the width of the slot 215 is greater than the width of the windings.

In the present embodiment, the pole shoe 2133 comprises a pole arc surface 21331, which is the inner circular arc of the pole shoe 2133. The arc length of the pole arc surface 21331 is close to a quarter of the circumference where the pole arc surface 21331 is located. The plurality of pole arc surfaces 21331 encloses an accommodating space to allow the rotor 30 to be rotatably received therein.

The rotor 30 is an embedded permanent magnet rotor comprising a rotor core 31 and permanent-magnet poles made of a plurality of permanent magnets. In the present embodiment, the rotor core 31 is substantially a hollow cylinder, and a rotating shaft (not shown) extends through and is fixed to the rotor core 31. The permanent magnets 33 are blocky permanent magnets embedded inside the rotor core 31 along the axial direction. In the present embodiment, the number of the permanent-magnet poles is the same as the number of the stator teeth 213, that is, the number of magnetic poles of the stator 20 is the same as the number of magnetic poles of the rotor 30. In the present embodiment, the number of the permanent-magnet poles is four and the four permanent-magnet poles are evenly distributed inside the rotor core 31 along the circumferential direction of the rotor core 31.

The outer circumferential wall of the rotor core 31 is an irregular cylinder. In the present embodiment, the outer circumferential wall of the rotor core 31 comprises a plurality of circular arc surfaces 312 and transition surfaces 313 arranged alternately. The transition surfaces 313 are short flat surfaces.

The rotor 30 is rotatably accommodated in the accommodating space of the stator 20. In the present embodiment, the axis of the rotor 30 coincides with the axis of the stator 20. An air gap 50 is formed between the circumferential wall of the rotor core 31 and the pole shoes 2133, so that the rotor can rotate relative to the stator 20. The minimum distance from the circular arc surface 312 to the pole arc surface 21331 along the circumferential wall of the rotor core 31 is less than the minimum distance from the transition surface 313 to the pole arc surface 21331 along the rotor core 31, thus, the air gap 50 is an uneven air gap and the rotor successfully avoids the starting dead point.

Please refer to FIG. 2 continuously, in the present embodiment and seeing from the axis direction of the rotor core 31, the center line (the broken line A as shown in the drawing) of the neutral region of two adjacent permanent magnets 33 coincides with the center line of the transition surface 313 which is near such two permanent magnets 33. The magnetic pole axis (the broken line B as shown in the drawing) of each permanent magnet 33 coincides with the center line of one of the circular arc surfaces 312.

Understandably, in other embodiments and seeing from the axis direction of the rotor core 31, each transition surface 313 may be an approximate curved surface formed by connecting a plurality of short flat surfaces or a circular arc surface with different curvature from the circular arc surface 312 or other shape. The plurality of circular arc surfaces 312 is located on a circumferential wall of the same cylinder.

In the field of motor, the so-called Dead Point Position is the position where the torque of the rotor is zero when the stator winding is energized. Please refer to FIG. 4, which is the distribution map of the magnetic line of force under the premise that the motor is in a non-energized state when the rotor core 31 of the existing technology is a cylinder, i.e. the air gap between the stator 20 and rotor 30 are uniform air gap. When the motor is in a non-energized state, the center line of the neutral region of adjacent two permanent magnets 33 is coinciding with the center line of one of the slots 215, and the magnetic pole axis B of the rotor magnetic pole 33 coincides with the magnetic pole axis of one of the stator teeth 213, the rotor position by this time is the dead point position.

The magnetic resistance between the slot 215 and the circumferential wall of the permanent magnet 33 increases due to the existence of the slot 215 while the magnetic resistance between the middle part of the pole arc surface 21331 of the stator 20 and the corresponding permanent magnet 33 is minimum, therefore, each of the permanent magnets 33 rotates automatically to a position where its magnetic pole axis (the broken line B as shown in the drawing) coincides with the center line of one of the pole arc surfaces 21331. That is to say that the center line of the neutral region of the adjacent two permanent magnets 33 coincides with the center line of one of the slots 215, and the rotor 30 of the motor 100 is at the starting dead point position.

Figure 5:
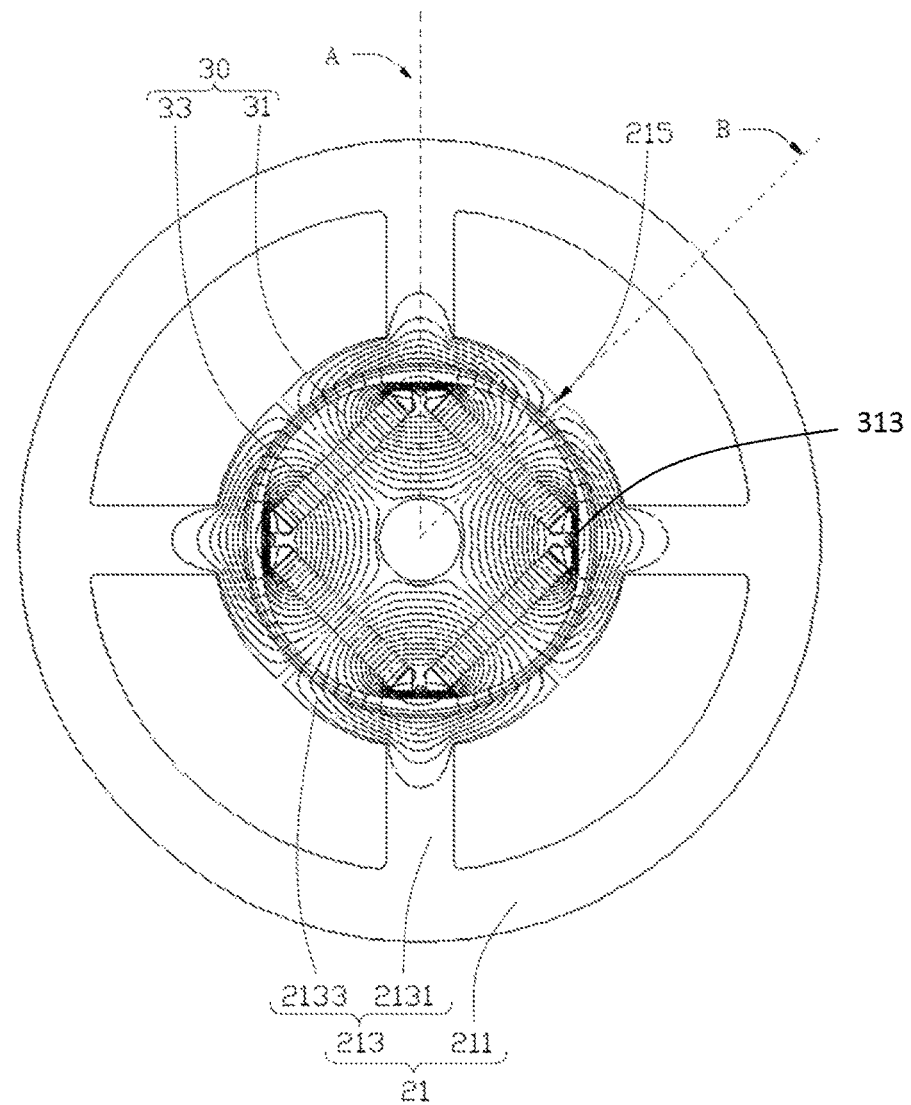
FIG. 5 is a distribution map of magnetic line of force generated by the rotor under the premise that the stator and rotor of an embodiment of the present disclosure are in a non-energized state.

Please refer to FIG. 5, which is the distribution map of magnetic line of force when the motor 100 is in a non-energized state according to an embodiment of the present disclosure. The magnetic resistance of the magnetic circuit undergone by the magnetic field generated by the rotor permanent-magnet pole is minimum when the position of the magnetic pole axis of each permanent magnet 33 aligns with the position of the center line of one of the slots 215 due to the existence of the transition surface 313. Therefore, each of the permanent magnets 33 rotates automatically to a position where its magnetic pole axis coincides with the center line of one of the slots 215, that is to say that the center line of the neutral region of two adjacent permanent magnets 33 coincides with the center line of one of the winding portions 2131, so that the rotor 30 of the motor 100 is prevented from the starting dead point position. The angle of the magnetic pole axis of the permanent magnet 33 deviated from the center line of the adjacent winding portion 2131 is referred to as a starting angle.

The size of the starting angle may vary depending on the sizes of the plurality of circular arc surfaces 312 and transition surfaces 313. Please refer to FIG. 2 again, for the convenience of illustration, the minimum circumferential distance of each slot 215 is defined as a, the maximum width of the air gap 50 is defined as b1, and the minimum width of the air gap 50 is defined as b2, that is, the maximum distance from the transition surface 313 along the radial direction of the rotor core 31 to the pole arc surface 21331 is b1, and the minimum distance from the circular arc surface 312 to the corresponding pole arc surface 21331 is b2. wherein, $b2<a<b1$, that is, the circumferential width a of each slot 215 is larger than the minimum distance b2 from the circular arc surface 312 to the pole arc surface 21331, while it is smaller than the maximum distance b1 from the transition surface 313 along the radial direction of the rotor core 31 to the pole arc surface 21331. Moreover, $b2<b1<3*b2$, that is, the maximum distance b1 from the transition surface 313 along the radial direction of the rotor core 31 to the pole arc surface 21331 is more than the minimum distance b2 from the circular arc surface 312 to the pole arc surface 21331, but it is less than three times the minimum distance b2 from the circular arc surface 312 to the pole arc surface 21331.

In the present embodiment, the pole-arc angle of the rotor is c, wherein, $100°<c<150°$ electrical angle.

The starting angle is between 70° and 110° electrical angle. When the starting angle of the motor 100 is set to be 90°, the rotor 30 can be started along a first direction when the winding of the stator 20 is supplied with current flows in one direction; when the winding of the motor stator 20 is supplied with current flows in an opposite direction, the rotor 30 can be started along a second direction opposite to the first direction.

Figure 4:
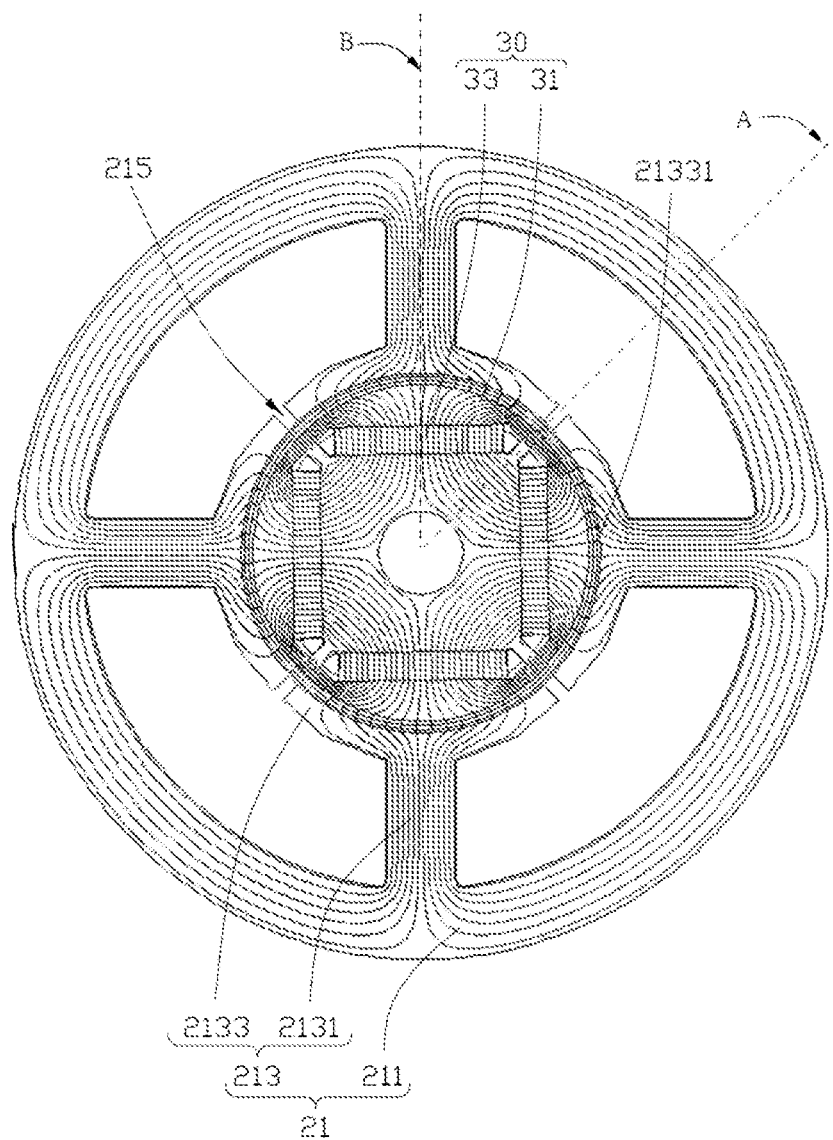
FIG. 4 is a distribution map of magnetic line of force generated by a rotor under the premise that the existing stator and rotor are in a non-energized state.
Figure 6:
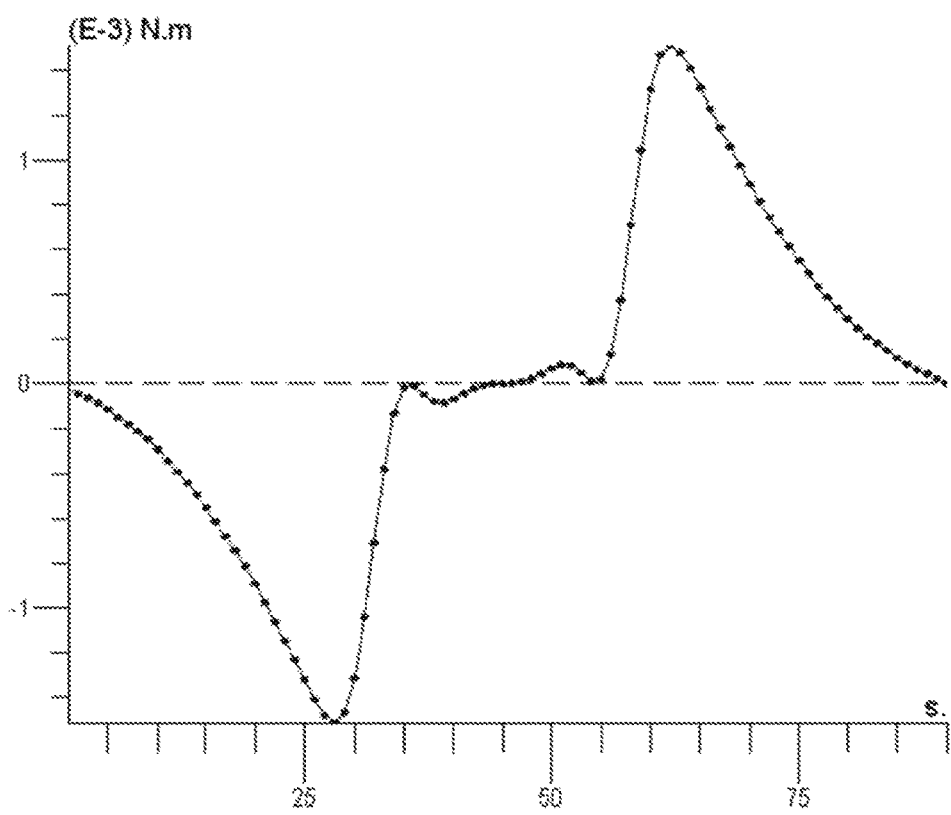
FIG. 6 is a cogging torque curve chart of the stator and rotor as shown in FIG. 4.
Figure 7:
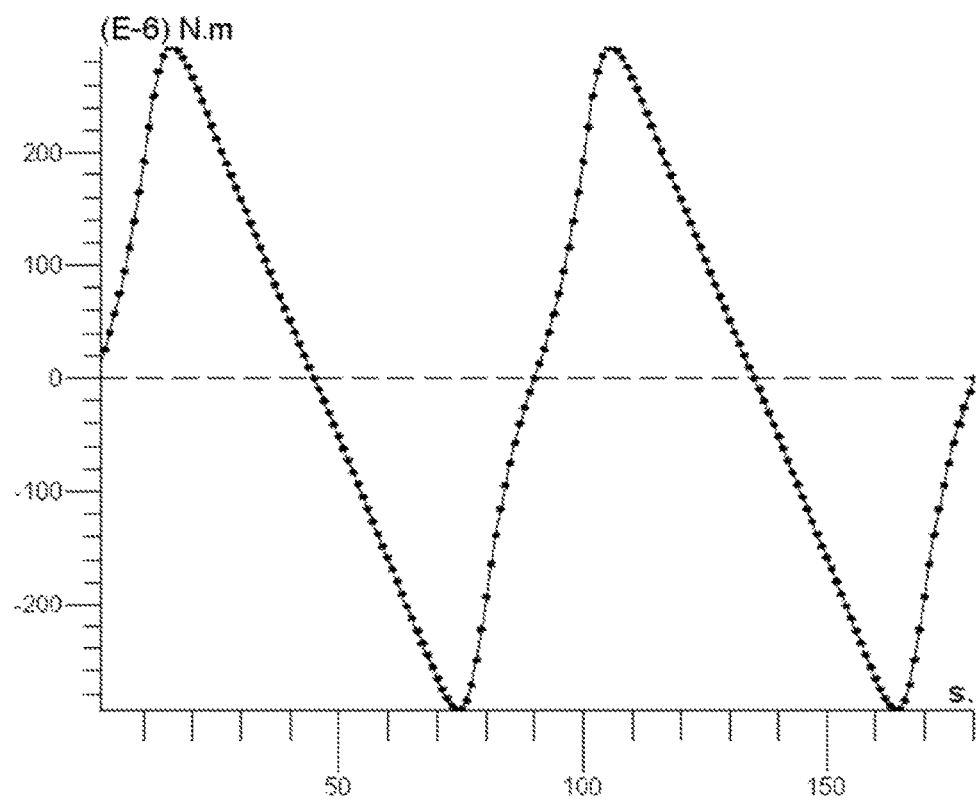
FIG. 7 is a cogging torque curve chart of the stator and rotor according to an embodiment of the present disclosure.

Please refer to FIG. 6 and FIG. 7, FIG. 6 is a cogging torque curve chart of the motor 100 when the motor, of whom, the outer wall of the rotor core 31 has a cylindrical shape, is as shown in FIG. 4. In FIG. 6, the ordinate is the torque to which the rotor 30 is subjected, and the abscissa is the time of a quarter electric period, wherein the time correspond to the angle at which the center line of the neutral region of two adjacent permanent magnets 33 deviated from the center line of the adjacent slot 215, one second correspond to one degree electrical angle. It can be seen that when the rotor core 31 has no transition surface 313, there is a stable point when the center line of the neutral region of the adjacent two permanent magnets 33 coincides with the center line of the adjacent slot 215.

In FIG. 7, the ordinate is the torque to which the rotor 30 of the present disclosure is subjected, and the abscissa is time of a half electric period, wherein the time correspond to the angle at which the center line of the neutral region of the adjacent two permanent magnets 33 deviated from the center line of the adjacent winding portion 2131, one second correspond to one degree electrical angle. It can be seen that when the rotor core 31 has been provided with the plurality of circular arc surfaces 312 and transition surfaces 313, there is a stable point when the center line of the neutral region of the adjacent two permanent magnets 33 coincides with the center line of the adjacent winding portion 2131.

In the present embodiment, the stator core 21 is formed by stacking a plurality of magnetic laminations along an axial direction of the motor 100, and the magnetic laminations are made of soft magnetic material (silicon steel sheet is commonly used in the industry) having magnetic permeability, they may be silicon steel sheet, etc.

The motor 100 of the present disclosure has been provided with a plurality of circular arc surfaces 312 and transition surfaces 313 on the circumferential wall of the rotor core 31, so that the rotor 30 avoids the starting dead point of the motor 100, and the starting of the motor 100 becomes more stable and reliable, and requires lower starting current. The electromagnetic noise, the iron loss, as well as the temperature rise of the motor 100 have been reduced and the motor 100 has maintained a high performance by changing the shape of the punching periphery of the motor rotor 30.

What described above is a preferable embodiment of the present invention only, rather than any limit to the present invention in any way. For example, the stator core may adopt an integrally formed stator yoke and stator teeth by way of powder metallurgy in addition to the way of lamination as described above. Besides, those skilled in the art may make other variations within the spirit of the present invention. Of course, such variations made in accordance with the spirit of the present invention shall be comprised within the scope of protection of the present invention as claimed.

The invention claimed is:

1. A single phase motor rotor, comprising:
   a rotor core, an outer circumferential wall of the rotor core being an irregular cylinder and comprising a plurality of spaced circular arc surfaces and transition surfaces; and
   a plurality of permanent magnets evenly spaced and embedded in the rotor core,
   wherein two opposite ends of each of the transition surfaces are directly connected to two of the circular arc surfaces respectively, each of the transition surfaces is a short flat surface inwardly concaved relative to the circular arc surfaces.

2. The single phase motor rotor according to claim 1, wherein a center line of a neutral region of adjacent two of the permanent magnets coincides with a center line of a corresponding one of the transition surfaces.

3. The single phase motor rotor according to claim 1, wherein a magnetic pole axis of each permanent magnet coincides with a center line of a circular arc surface near the permanent magnet.

4. The single phase motor rotor according to claim 1, wherein the plurality circular arc surfaces are provided on a surface of a same cylinder.

5. A single phase motor, comprising:
   a stator comprising a stator core, the stator core comprising an outer yoke and a plurality of stator teeth extended inward from the outer yoke, each stator tooth comprising a winding portion and a pole shoe coupled to one end of the winding portion; and
   a rotor comprising a rotor core and a plurality of permanent magnets, an outer circumferential wall of the rotor core being an irregular cylinder and comprising a plurality of spaced circular arc surfaces and transition surfaces, the permanent magnets being evenly spaced and embedded in the rotor core,
   wherein two opposite ends of each of the transition surfaces are directly connected to two of the circular arc surfaces respectively, each of the transition surfaces is a short flat surface inwardly concaved relative to the circular arc surfaces, or each of the transition surfaces is formed by connecting a plurality of short flat surfaces inwardly concaved relative to the circular arc surfaces.

6. The single phase motor according to claim 5, wherein a center line of a neutral region of adjacent two of the permanent magnets coincides with a center line of a corresponding one of the transition surfaces, and a magnetic pole axis of each permanent magnet coincides with a center line of a circular arc surface near the permanent magnet.

7. The single phase motor according to claim 5, wherein the plurality circular arc surfaces are provided on a surface of a same cylinder.

8. The single phase motor according to claim 5, wherein a slot is defined between two adjacent pole shoes and an uneven air gap with unequal spacing is defined between the pole shoes and the rotor.

9. The single phase motor according to claim 8, wherein a distance between the transition surfaces and the pole shoes exceeds a distance between the circular arc surfaces and the pole shoes.

10. The single phase motor according to claim 9, wherein a center line of a neutral region of adjacent two permanent magnets substantially coincides with a center line of a corresponding one of the transition surfaces and a center line of a corresponding one of the winding portions upon a condition that the motor is in a non-energized state.

11. The single phase motor according to claim 9, wherein a minimum circumferential distance of the slot is a, a maximum distance from the transition surface along the radial direction of the rotor core to the corresponding pole shoe is b1, a minimum distance from the circular arc surface along the radial direction of the rotor core to the pole shoe is b2, wherein, b2<a<b1.

12. The single phase motor according to claim 11, wherein the maximum distance from the transition surface along the radial direction of the rotor core to the pole shoe is more than the minimum distance from the circular arc surface of the rotor core to the pole shoe, but it is less than three times the minimum distance from the circular arc surface of the rotor core to the pole shoe.

13. The single phase motor according to claim 5, wherein a pole-arc angle of the rotor is c, wherein, 100°<c<150° electrical angle.

14. The single phase motor according to claim 5, wherein a starting angle of the motor is between 70° and 110° electrical angle.

15. The single phase motor according to claim 5, wherein each of the pole shoes comprise a pole arc surface towards the rotor, the pole arc surfaces of the pole shoes are located on a same cylindrical surface and enclose an accommodating space together, the rotor is rotatably received in the accommodating space.

16. A single phase motor rotor, comprising:
   a rotor core, an outer circumferential wall of the rotor core being an irregular cylinder and comprising a plurality of circular arc surfaces and transition surfaces arranged alternately; and
   a plurality of permanent magnets evenly spaced and embedded in the rotor core,
   wherein two opposite ends of each of the transition surfaces are directly connected to two of the circular arc surfaces respectively, each transition surface is a substantial arc surface, the substantial arc surface is formed by connecting a plurality of short flat surfaces or a circular arc shaped surface, the curvature of the transition surface is smaller than the curvature of the circular arc surfaces beside the transition surface, and bending directions of the transition surfaces and the circular arc surfaces are the same.

* * * * *